United States Patent
Hoover

[19]
[11] Patent Number: 5,884,182
[45] Date of Patent: Mar. 16, 1999

[54] METHOD FOR RESPONDING TO CHANNEL POINTERS USING CHANNEL BANDS

[75] Inventor: David James Hoover, Cary, N.C.

[73] Assignee: Ericsson, Inc., Research Triangle Park, N.C.

[21] Appl. No.: 865,281

[22] Filed: May 29, 1997

[51] Int. Cl.⁶ .................................................. H04Q 7/00
[52] U.S. Cl. ........................ 455/455; 455/434; 455/516; 455/161.3; 455/168.1; 455/179.1
[58] Field of Search .................................. 455/422, 434, 455/450, 454, 455, 426, 509, 512, 513, 514, 515, 516, 517, 62, 161.1–161.3, 166.1–166.2, 168.1, 176.1, 179.1, 180.1, 182.1, 188.1, 186.1, 200.1

[56] References Cited

U.S. PATENT DOCUMENTS 5,586,338  12/1996  Lynch et al. ............................ 455/433

OTHER PUBLICATIONS

"Intelligent Roaming," TR45.3.6/97.04.28.13, Source: AT&T Wireless Services, Inc., 57 pages.

*Primary Examiner*—Doris H. To
*Attorney, Agent, or Firm*—Rhodes, Coates & Bennett, LLP

[57] ABSTRACT

An improved method is claimed for responding to channel pointers in a wireless communications system, such as a cellular telephone system, operating on a communications spectrum having channel bands. The method includes storing a band search list, receiving a channel to a pointer to a pointed-to control channel, and disregarding the channel pointer if the pointed-to is in a channel band not included on the band search list. The improved method improves system response time and more efficiently utilizes system resources.

12 Claims, 4 Drawing Sheets

METHOD FOR RESPONDING TO CHANNEL POINTERS USING CHANNEL BANDS

FIELD OF INVENTION

The present invention relates generally to the communications field and, in particular, to a method for reducing the amount of time and resources required to find a suitable communications channel.

BACKGROUND OF THE INVENTION

Wireless communication systems, such as cellular telephone systems, have proved to be very popular. Such systems typically include numerous mobile units (e.g., cellular telephones), a plurality of base stations at fixed locations, and one or more switching centers connecting the wireless communication systems to other communications systems, such as the land line public switched telephone network.

It is common for such systems to employ a large number of discrete communication channels for communicating voice and data from one location to another and for controlling system functions. It is also common for there to be multiple communications service providers in competition with each other for each type of communication service. As such, within a given geographical area it is typical for the various communication channels to be allocated to the different competitors such that only one service provider is responsible for providing service on any given channel.

To facilitate communications channel allocation, the spectrum of channels may be divided into several channel bands, each containing a plurality of communications channels. Thereafter, an entire channel band may be allocated to a particular service provider for a given geographic region. Thus, in a certain region, service provider Alpha may be allocated channel bands A and C, while service provider Beta may be allocated channel band B, and service provider Gamma all other channel bands. The particular details of the channel band allocations are well known in the industry. Further, because it is desirable for a subscriber of service provider Alpha to use service provider Alpha's communications channels, it is common for mobile units subscribing to Alpha's service to maintain a listing of the channel bands allocated to Alpha. This list is then used to preferentially select which channels are used for communications.

During use, it is common for the mobile unit to be switched from one channel to another, an event which can be triggered by a wide variety of reasons. For example, in a cellular phone call release procedure, a cellular base station can provide a channel pointer that will direct a mobile cellular phone to switch to a new control channel to await future paging signals. As another example, a mobile unit may receive a channel pointer as part of a redirection procedure to alleviate overload conditions when a base station is handling too many communications sessions. In any event, because it is very desirable for channel switching to be transparent to the user, this channel switching must happen as quickly as possible. In addition, because the channel switching utilizes system resources including mobile unit power, the switching procedure should be as efficient as possible.

SUMMARY OF THE INVENTION

The present invention is an improved method for responding to channel pointers in a wireless communications system, such as a cellular telephone system, operating on a communications spectrum having channel bands. The improved method reduces the time required to switch channels in some situations and otherwise increases the efficiency of channel switching. The present inventive method includes the steps of storing a band search list, receiving a channel pointer to a pointed-to control channel, and determining whether the pointed-to channel is in a channel band on the band search list. If the pointed-to channel is in a channel band on the band search list, additional checks of the channel are performed. If the pointed-to channel is in a channel band not on the band search list, the channel pointer is disregarded. One advantage of this improved method is that time and system resources are not expended in measuring signal strength or verifying service provider information unless the pointed-to channel is in an acceptable channel band.

DETAILED DESCRIPTION

Figure 1:
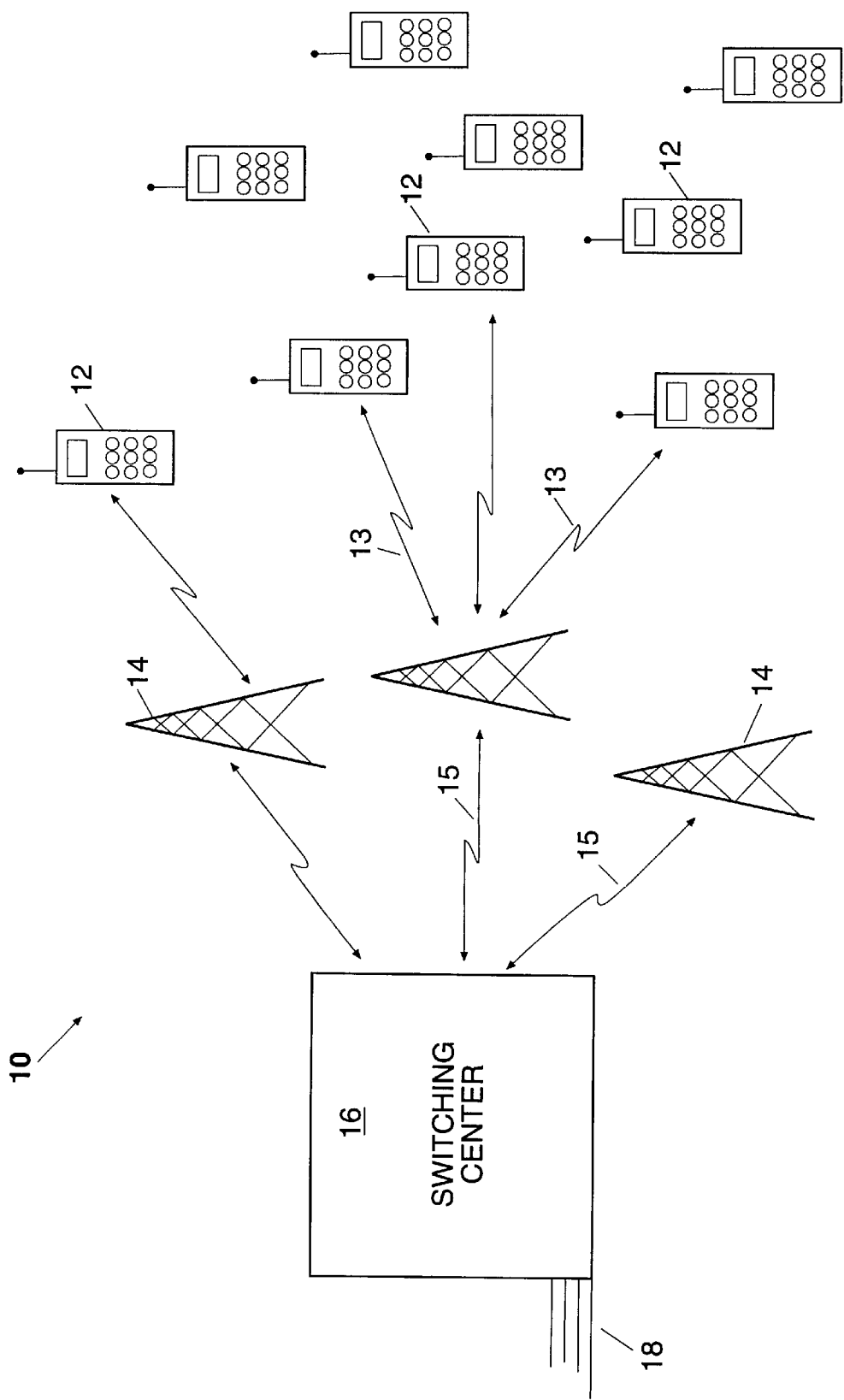
FIG. 1 is a simplified representation of a cellular telephone wireless communications system.

A wireless communications system 10 typically includes numerous mobile units 12 (e.g., cellular telephones), a plurality of base stations 14, and one or more switching centers 16 connecting the wireless communications system 10 to other communications systems 18, such as the public switched telephone network (see FIG. 1). Typically, the mobile units 12 communicate with the base stations 14 using radio links 13. Likewise, the base stations 14 typically communicate with the switching center 16 via radio links 15.

Figure 2:
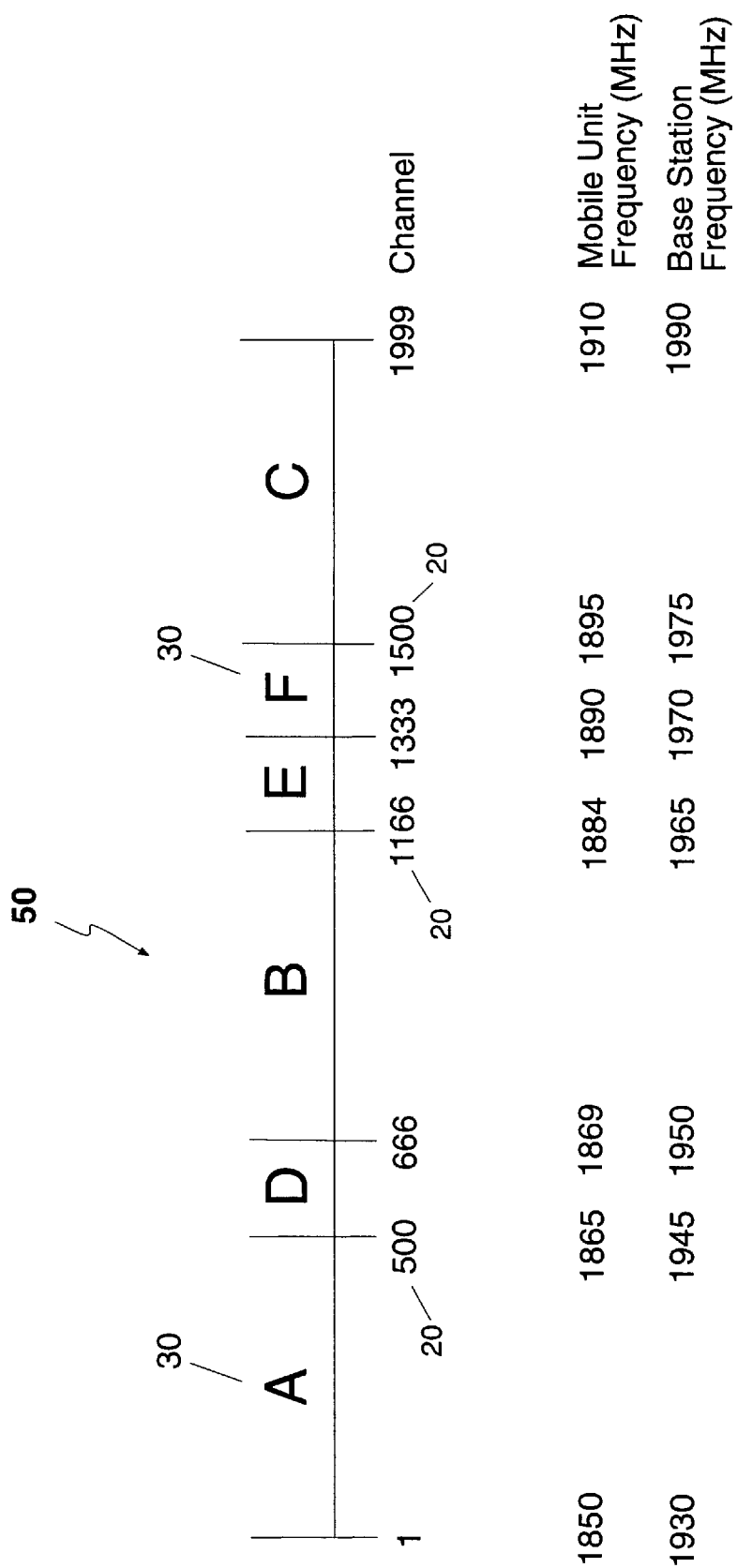
FIG. 2 is an example of a typical communication spectrum organization showing channel bands.

The radio links 13 typically include numerous discrete communications channels 20 on one or more communications spectrums 50 (see FIG. 2). A communications channel 20 is typically a pair of frequencies, one transmit and one receive, used by a mobile unit 12 to communicate within a wireless communications system 10. Some communications channels 20 are for control functions (control channels) while others are for voice and data communications (traffic channels). Examples of control functions include locating a particular mobile unit 12, establishing a new communications session, and transferring oversight of a communications session from one base station 14 to another.

A wireless communications system 10 may utilize more than one communications spectrum 50. For instance, one spectrum 50 may be in the 800–900 MHz range while another may be in the 1850–2000 MHz range. For simplicity, the following description will discuss only one spectrum 50, but it is to be understood that the invention also includes the use of multiple spectrums 50.

A plurality of communications service providers typically compete in providing wireless communications service on a particular communications spectrum 50. It is customary for these different service providers to be allocated portions of the communications spectrum 50 called "channel bands" 30. FIG. 2 shows a communications spectrum 50 divided into six channel bands (A–F) 30, each comprised of a plurality of communications channels 20. As shown in FIG. 2, each communications channel 20 in the spectrum 50 has an identification number and is composed of a specific mobile unit-base station frequency pair. Also as shown in FIG. 2, each communications channel 20 is assigned to a specific channel band 30.

The spectrum 50 of FIG. 2 represents the 1900 MHz spectrum of the Telecommunication Industry Association's interim standard IS-136 and is illustrative of a common method of structuring a communications spectrum 50. The spectrum structure of FIG. 2 forms the basis for the description herein; however, other communications spectrum 50 organizations are possible. The present invention is intended to work with any communications spectrum 50 structure that utilizes a band or grouping approach with predetermined assignment of communication channels 20 to bands or groups. An important feature of such spectrum 50 structures is that because each individual communications channel 20 is uniquely identified, and because the assignment of a communications channel 20 to a channel band 30 is fixed, it is relatively simple to determine what channel band 30 a particular communications channel 20 belongs to. Such determination can be accomplished using various techniques such as a look-up table or a simple identification number algorithm based on the communications channel's 20 identification.

The channel bands 30 are allocated as units to various service providers in a given area such that only one service provider is responsible for providing service on all the communications channels 20 in any given channel band 30 in a given area. Thus, service provider Alpha in a certain region may be allocated channel bands A and C, while service provider Beta may be allocated channel band B, and service provider Gamma all other channel bands 30.

Each channel band 30 typically includes both control channels and traffic channels, with the particular assignment of a given communications channel 20 to these categories possibly changing from service provider to service provider and/or from area to area. In addition, different channel bands 30 may include different quantities of control channels and traffic channels.

It is common in wireless communications systems 10 for mobile units 12 to contain a band search list. A band search list is an ordered list of channel bands 30 reflecting those channel bands 30 allocated to the particular service provider to which the mobile unit 12 is subscribed to (the "primary service provider"). In addition, the band search list may contain channel bands 30 of other service providers who have been authorized to provide service to the mobile unit 12 by the primary service provider.

As an example, assume service provider Alpha is allocated channel bands A and C of FIG. 2, service provider Beta is allocated channel band B, service provider Gamma is allocated channel bands D, E, and F. Further, assume that service provider Beta has contracted with Alpha to provide service to Alpha's mobile units 12 when necessary or desirable, but Gamma has not. In this scenario, Alpha mobile units 12 would have a band search list of three channel bands 30, with A and C occupying the first two positions and B the third. The band search list of Alpha mobile units 12 would not contain channel bands D, E, or F.

Band search lists are primarily employed at power-up. An Alpha mobile unit 12 having the band search list of A, C, then B wile first search channel band A at initial power-up, then C, then B. As soon as a suitable communications channel 20 is detected, the search terminates and a connection to the rest of the wireless communications system 10 is established. Due to the order of searching, it is most likely that the connection will be with the primary service provider, Alpha in this example on channel bands A or C. Thus, preference is given to those channel bands 30 controlled by service providers to whom the mobile unit 12 would be properly subscribed.

Band search lists may also be used after power-up. For instance, when a mobile unit 12 is monitoring a communications channel 20, waiting for a page, the mobile unit 12 may be monitoring a communications channel 20 controlled by a service provider other than its primary service provider. If so, the mobile unit 12 may, from time to time, reinitiate a search of the channel bands 30 in the band search list in an effort to find a suitable communications channel 20 controlled by its primary service provider. The band search list may also serve other functions known in the art.

Because of its importance, the band search list is commonly stored in semipermanent memory in the mobile unit 12. That is, the band search list is stored in the mobile unit 12 even while the mobile unit 12 is not in use, but the contents of the band search list can be changed by the wireless communications system 10.

In order to properly participate in control functions within the wireless communications system 10, a mobile unit 12 will communicate with a base station 14 over a control channel. In the course of operating, the mobile unit 12 may be instructed to switch to another control channel. For instance, a mobile unit 12 may be communicating with a base station 14 over a control channel, such as channel number 127 in channel band A, and switch to a new control channel, such as channel number 1540 in channel band C. One common method to accomplish such control channel switching is to employ channel pointer instructions which are simply commands issued by the base station 14 instructing the mobile unit 12 to change from the current control channel to a new control channel. The new control channel is referred to as the "pointed-to channel," and the instruction is called a "channel pointer" instruction.

Channel pointers may be issued in response to a wide variety of conditions. For example, during call release at the end of a communications session, if the mobile unit 12 is to remain powered on, the base station 14 typically issues a channel pointer instruction to direct the mobile unit 12 to stop monitoring the current control channel and begin monitoring a new control channel. Channel pointers may also be used to encourage switching from an analog control channel to a digital control channel. When a mobile unit 12 is digitally capable but initially connects with a base station 14 on an analog control channel, it is typically desirable for the connection to the base station 14 to be switched to a digital control channel. In order to facilitate channel switching, the base station 14 may periodically broadcast a channel pointer to an available digital control channel. As a further example, channel pointers may also be generated in response to overload conditions in order to more optimally distribute the working load between parts of the wireless communications system 10. Channel pointers may also be encountered for various other reasons well known in the art.

Figure 3:
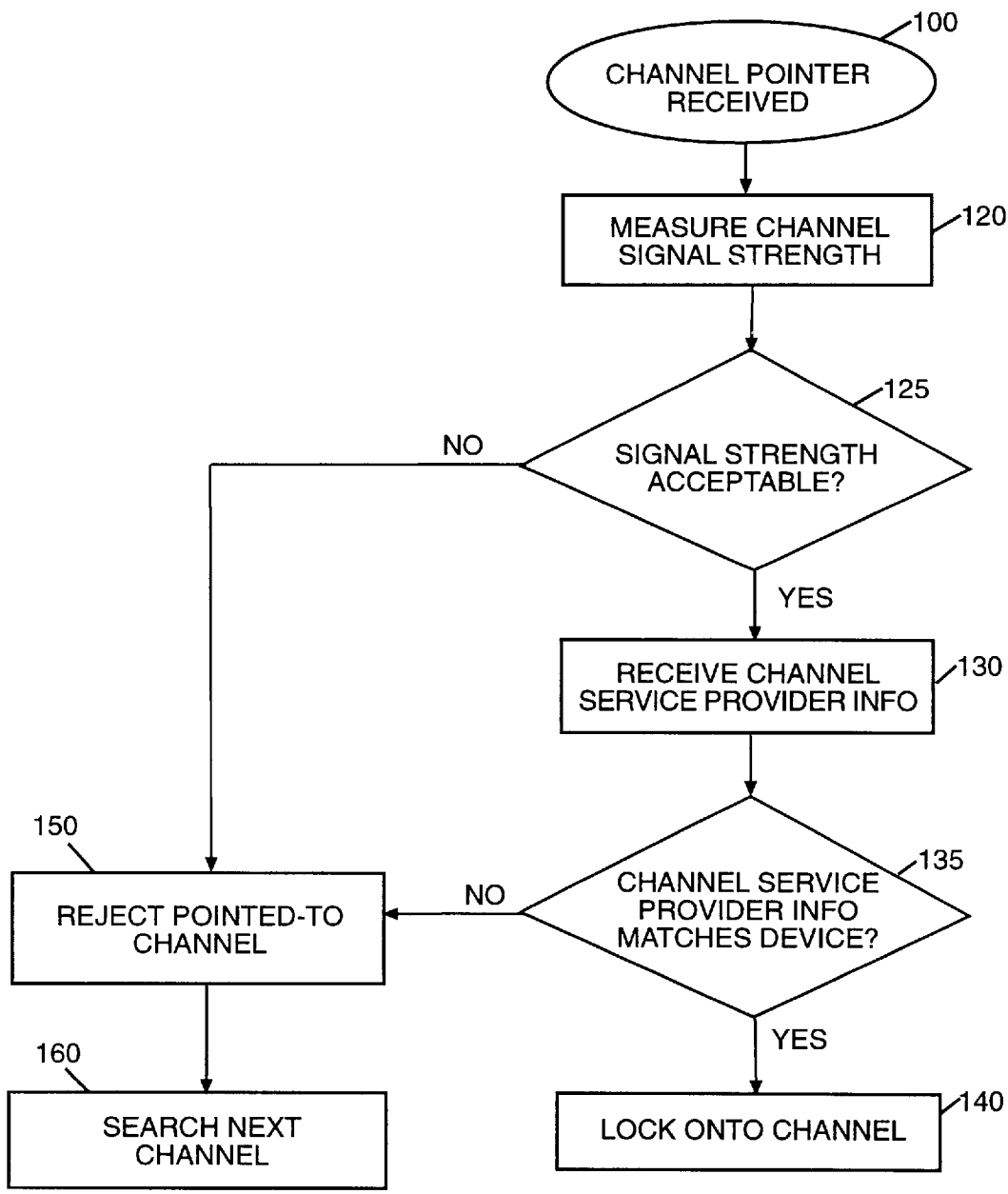
FIG. 3 is a simplified logic flow diagram of the prior art.

Under the prior art, the mobile unit 12 follows the logic shown in FIG. 3 in responding to a channel pointer instruction. Upon receipt of a channel pointer (box 100), the mobile unit 12 first measures the channel strength of the pointed-to channel (box 120). If this channel strength is at an acceptable level (box 125), the pointed-to channel's service provider information is received (box 130). Upon receipt of this service provider information (box 130) the information is decoded as necessary and compared against the channel service provider information stored in the mobile unit 12

(box 135). If the information matches, then the mobile unit 12 locks onto the pointed-to channel and regular control channel communication begins (box 140). If the signal strength is not acceptable, or if the channel service provider information does not match, then the pointed-to channel is rejected (box 150) and the mobile unit 12 begins to scan the other communications channels 20 according to the band search list (box 160). The details of the operation of each of these steps are well known in the industry and not necessary to understanding the present invention. What is important to understand that the steps represented by boxes 120–135 take time and utilize system 10 and/or mobile unit 12 resources prior to the acceptability of the pointed-to channel being determined.

If the pointed-to channel is in a channel band 30 on the band search list (box 160), then this expending of time and resources is necessary. However, if the pointed-to channel is in a channel band 30 which is not on the band search list (box 160), then time and resources have been unnecessarily expended.

Figure 4:
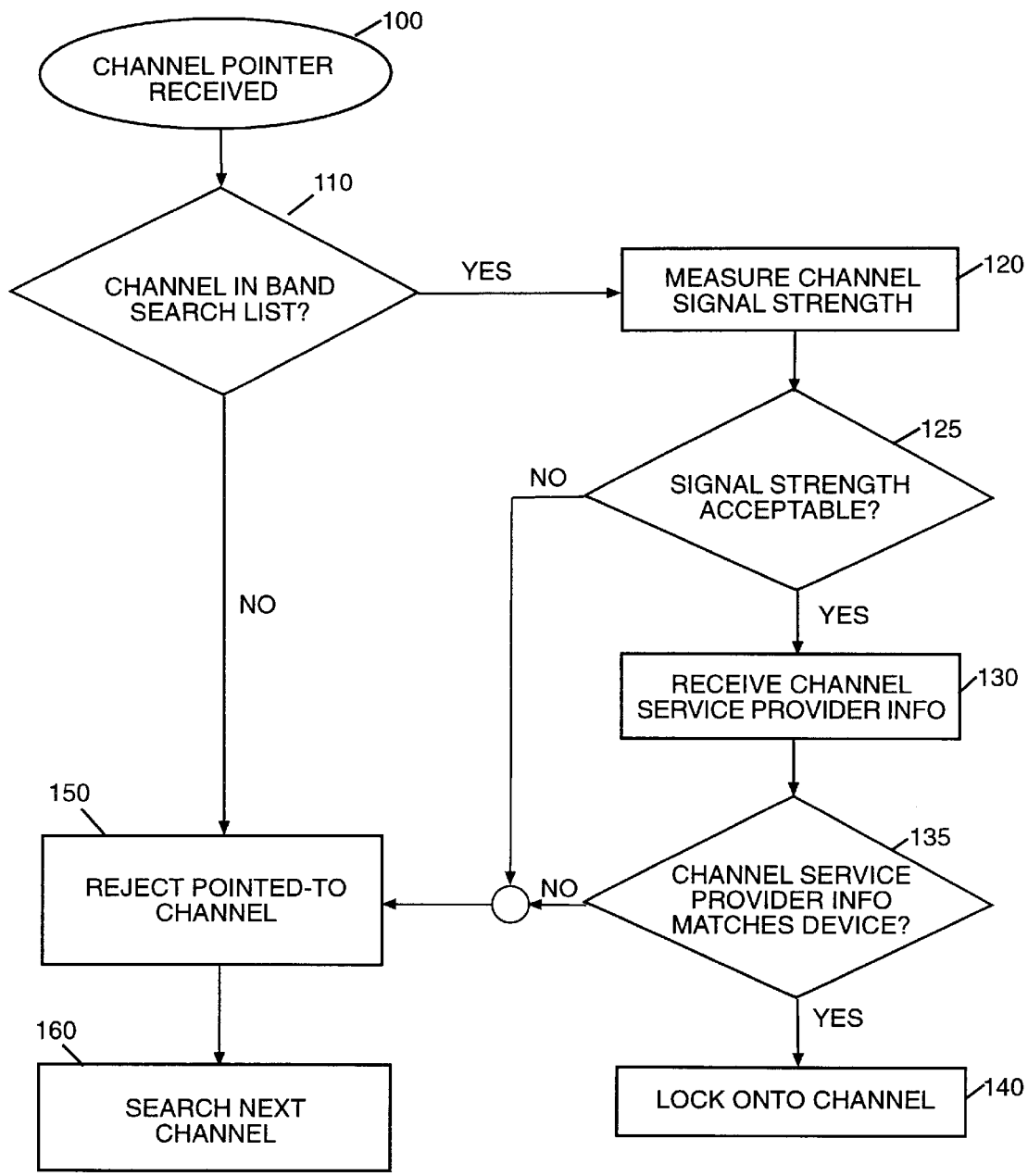
FIG. 4 is a simplified logic flow diagram of the present invention.

In order to improve the operation of this method, the present invention involves the insertion of an additional step between receipt of the channel pointer (box 100) and measurement of the channel signal strength (box 120) (see FIG. 4). This additional step is a checking step (box 110) wherein the pointed-to channel's channel band 30 is compared against the band search list. If the pointed-to channel is in a channel band 30 on the band search list then the procedure continues (box 120). If, however, the pointed-to channel is in a channel band 30 that is not on the band search list, then the pointed-to channel is rejected (box 150) and the signal strength and service provider information of the pointed-to channel need not be checked. Instead, the mobile unit 12 will proceed immediately to checking communications channels 20 that are on channel bands 30 which are on the band search list (box 160).

Using the improved method of this invention will result in improved performance in handling channel pointers. If, in the example described, the Alpha mobile unit 12 receives a channel pointer to a channel in channel band D, the mobile unit 12 can avoid spending time and resources measuring the signal strength and verifying the service provider information of the pointed-to channel. Instead, the mobile unit 12 can quickly proceed with the task of finding a suitable control channel on an authorized channel band 30. Thus, using the improved method of this invention will lead to quicker and more efficient locating of suitable control channels.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. In a wireless communication system operating on a communications spectrum having channel bands, a method for responding to a channel pointer comprising the steps of:
   a) storing a band search list;
   b) receiving a channel pointer to a pointed-to communications control channel;
   c) determining whether said pointed-to channel is in a channel band that is included on said band search list; and
   d) disregarding said channel pointer if said pointed-to channel is not in a channel band that is included on said band search list.

2. The method of claim 1 wherein said band search list is stored local to a mobile unit.

3. The method of claim 2 wherein said band search list is stored in semipermanent memory in said mobile unit.

4. The method of claim 1 further comprising the step of determining whether said pointed-to channel has acceptable signal strength if said pointed-to channel is in a channel band that is included on said band search list.

5. The method of claim 1 further comprising the step of determining whether said pointed-to channel has acceptable channel service provider information if said pointed-to channel is in a channel band that is included on said band search list.

6. The method of claim 5 further comprising the step of establishing communications on said pointed-to channel if said pointed-to channel has acceptable service provider information.

7. In a wireless communication system operating on a communications spectrum having channel bands, a method of responding to a channel pointer comprising the steps of:
   a) storing a band search list;
   b) receiving a channel pointer to a pointed-to communications control channel;
   c) determining whether said pointed-to channel is in a channel band that is included on said band search list;
   d) thereafter and only if said pointed-to channel is in a channel band that is included on said band search list, determining whether said pointed-to channel has acceptable signal strength; and
   e) if said pointed-to channel has acceptable signal strength, establishing control channel communications on said pointed-to channel.

8. The method of claim 7 further including the step of determining whether said pointed-to channel has acceptable channel service provider information before establishing control channel communications on said pointed-to channel and after determining that said pointed-to channel has acceptable signal strength.

9. In a wireless communication system operating on a communications spectrum having channel bands, a method of responding to a channel pointer comprising the steps of:
   a) storing a band search list local to the mobile unit in semi-permanent memory;
   b) receiving a channel pointer to a pointed-to communications control channel;
   c) determining whether said pointed-to channel is in a channel band that is included on said band search list;
   d) thereafter and only if said pointed-to channel is in a channel band that is included on said band search list, determining whether said pointed-to channel has acceptable signal strength;
   e) determining whether said pointed-to channel has acceptable channel service provider information after determining that said pointed-to channel has acceptable signal strength;
   f) if said pointed-to channel has acceptable signal strength and has acceptable service provider information, establishing control channel communications on said pointed-to channel; and
   g) if said pointed-to channel is not in a channel band that is included on said band search list, or if the pointed-to channel does not have acceptable signal strength, or if the pointed-to channel does not have acceptable service provider information, disregarding said channel pointer.

10. In a wireless communication system operating on a communications spectrum having channel bands, a method for responding to a channel pointer comprising the steps of:
   a) storing a band search list in semi-permanent memory of a mobile unit;
   b) receiving, at said mobile unit, a channel pointer to a pointed-to communications control channel;
   c) determining whether said pointed-to channel is in a channel band that is included on said band search list; and
   d) thereafter measuring the received channel signal strength of said pointed-to channel if said pointed-to channel is in a channel band that is included on said band search list or generating a channel pointer failure if said pointed-to channel is not in a channel band that is included on said band search list.

11. The method of claim 10 further comprising the step of determining whether said pointed-to channel has acceptable channel service provider information only if said pointed-to channel is in a channel band that is included on said band search list.

12. The method of claim 11 further comprising the step of establishing communications on said pointed-to channel if said pointed-to channel has acceptable service provider information.

* * * * *